United States Patent [19]

Jurva et al.

[11] Patent Number: 4,565,093
[45] Date of Patent: Jan. 21, 1986

[54] METHOD FOR FACILITATING HERMETICITY LEAKAGE TESTING OF AN ELECTRICAL FEEDTHROUGH

[75] Inventors: Edsel O. Jurva, Anoka; Richard L. Goodin, Blaine, both of Minn.

[73] Assignee: Medtronic, Inc., Minneapolis, Minn.

[21] Appl. No.: 586,220

[22] Filed: Mar. 5, 1984

Related U.S. Application Data

[62] Division of Ser. No. 308,308, Oct. 5, 1981, Pat. No. 4,460,664.

[51] Int. Cl.⁴ ............................................. G01M 3/20
[52] U.S. Cl. ........................................ 73/40.7; 429/90
[58] Field of Search ................... 73/40.7; 429/90, 101, 429/174, 181, 184

[56] References Cited

U.S. PATENT DOCUMENTS

| | | | |
|---|---|---|---|
| 4,128,703 | 12/1978 | Mead et al. | 429/101 |
| 4,166,158 | 8/1979 | Mead et al. | 429/181 |
| 4,174,424 | 11/1979 | Jurva et al. | 429/90 |
| 4,210,708 | 7/1980 | Mead et al. | 429/181 |
| 4,224,388 | 9/1980 | Stadnick | 429/181 |
| 4,233,372 | 11/1980 | Bro et al. | 429/174 |
| 4,241,152 | 12/1980 | Klink | 429/181 |
| 4,245,014 | 1/1981 | Veit, Jr. et al. | 429/181 |
| 4,326,016 | 4/1982 | Selover, Jr. et al. | 429/184 |
| 4,398,413 | 8/1983 | Rao | 73/40.7 |

*Primary Examiner*—Stewart J. Levy
*Assistant Examiner*—Joseph W. Roskos
*Attorney, Agent, or Firm*—Vidas & Arrett

[57] ABSTRACT

A method of manufacturing and testing an electrical feedthrough having a metal ferrule, and electrical lead, a glass seal for centrally locating the electrical lead axially within the ferrule, for electrically isolating the electrical lead from the ferrule and for hermetically sealing the feedthrough assembly, and an injection molded insulating material extending between the ferrule and lead and a fluorocarbon washer positioned adjacent the inner surface of the glass seal. The fluorocarbon washer retains helium and allows for the hermeticity leakage testing of the glass seal. The manufacturing and hermeticity testing of the aforementioned cell is accomplished by constructing the electrical feedthrough with the fluorocarbon washer in position; attaching the feedthrough to the hermetically sealed cells; placing the completer electrochemical cell in a pressurized atmosphere of a test gas, such as helium, for a period of time to force the test gas through the glass seal into the chamber containing the fluorocarbon washer, whereby the fluorocarbon washer absorbs helium gas; and examining the electrochemical cell for leakage of any of the helium back out through the glass seal. Gross and fine leakage testing may be accomplished by respectively observing the escape of the test gas at atmospheric pressure and drawing a vacuum on the electrical feedback and testing for the escape of the test gas with a mass spectrometer.

12 Claims, 2 Drawing Figures

U.S. Patent
Jan. 21, 1986
4,565,093
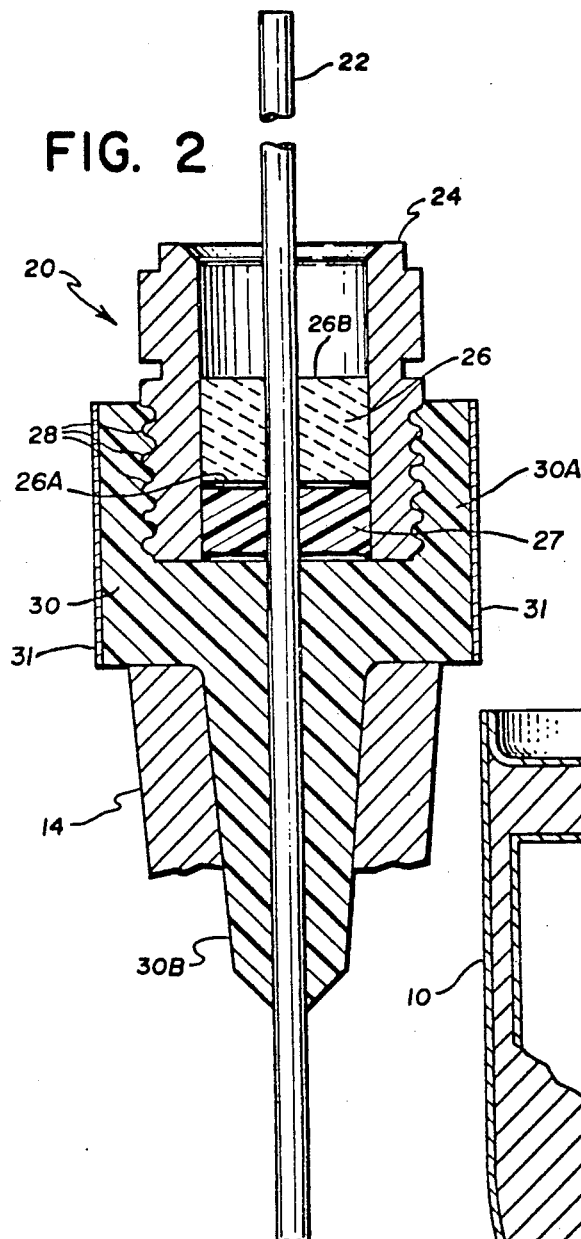
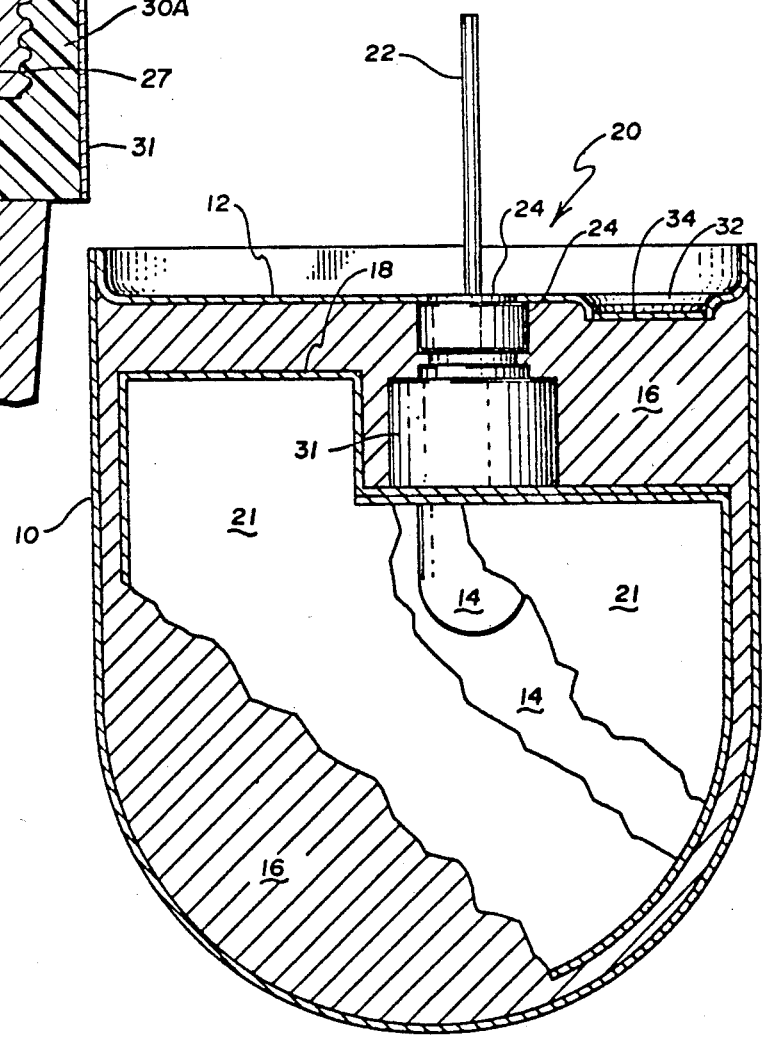

4,565,093

METHOD FOR FACILITATING HERMETICITY LEAKAGE TESTING OF AN ELECTRICAL FEEDTHROUGH

This is a division, of application Ser. No. 308,308, filed Oct. 5, 1981 U.S. Pat. No. 4,460,664.

BACKGROUND OF THE INVENTION

1. Field of the Invention

This invention relates to improved electrical feedthroughs, to a method of testing for hermeticity leakage of a hermetically sealed feedthrough, and to electrochemical cells which use the same.

2. Description of the Prior Art

Electrical feedthroughs serve the purpose of providing an electrical circuit path extending from the interior of a hermetically sealed container to an external point which is electrically insulated from the container itself. Many such feedthroughs are known in the art which provide the electrical path and seal the electrical container from liquid and gas and prevent short circuits between the feedthrough ferrule and the lead. A principal difficulty with electrical feedthrough lies in the continuing miniaturization of circuit components, electrochemical cells, and the resulting requirements for correspondingly smaller feedthrough dimensions. As the feedthroughs become miniaturized, it becomes more and more difficult to reliably manufacture a liquid and gas tight electrical feedthrough and to conduct the tests necessary to determine if the feedthrough is performing to specifications.

A particular electrical feedthrough of the present invention is employed in conjunction with an electrochemical cell to provide for an electrical path to the anode or cathode within the cell which is electrically isolated from the cell and the container. Such electrochemical cells are used in implantable medical devices, such as cardiac pacemakers, and in conjunction with complex miniaturized electronic circuits. Electrochemical cells, such as the lithium iodine cell described in U.S. Pat. No. 4,166,158, possess an active cathode which is capable of attacking many seal materials used in electrical feedthroughs, particularly if the seals possess minor cracks or defects. In such instances, the cathode material may both destroy the electrical insulating properties in the glass seal and migrate along the electrical leads to attack the integrated circuits and ultimately may cause the device to cease operating.

Electrical feedthroughs usually include a metal ferrule which retains the electrical lead and seal means. The ferrule is attached, as by welding, to the casing or cover of the electrochemical cell container and has a portion which extends into the interior of the container, and a portion which extends exteriorally of the cover. The interior portions of the feedthrough lead sealing means and ferrule have to be protected from the electrochemically active cathode material as shown, for example, in the aforementioned U.S. Pat. No. 4,166,158, and in the commonly assigned and co-pending U.S. patent application Ser. No. 273,475 filed June 15, 1981, which discloses a feedthrough, the inner portions of which are protected by plastic body which is molded to the feedthrough ferrule and the lead pin to provide for the required insulation in the context of a miniaturized feedthrough assembly.

SUMMARY OF THE INVENTION

This invention provides a feedthrough having a test gas retaining getter positioned adjacent the inner surface of the sealing means and within a plastic body which extends over the inward extending portion of the metal ferrule and the lead. The getter is preferably a helium getter material, such a polytetrafluoroethylene, the sealing means is preferably composed of glass, and the plastic body is preferably injection molded to the feedthrough ferrule, lead pin and PTFE washer.

It is an object of the present invention to provide such a new improved feedthrough construction which facilitates the hermeticity leakage testing of an assembled hermetically sealed container, such as an electrochemical cell. The hermeticity leakage testing is accomplished by providing such a PTFE washer adjacent the interior surface of the glass seal, attaching the feedthrough to an electrochemical cell, sealing the electrochemical cell, forcing helium at high pressure through molecular interstitial spaces within the glass seal and into the space occupied by the PTFE washer, and observing for the gross and fine leakage of helium back through the glass seal at atmospheric pressure or under a vacuum.

The present invention provides the advantages of being able to detect microscopic cracks and defects in the glass seal which would go undetected in the absence of a helium getter adjacent to the glass seal for retaining the helium in that position over a period of time sufficient to accomplish the testing. For example, in the absence of such a getter material, helium injected under pressure into the interior of the electrochemical cell would rapidly escape back through defects or cracks in the glass seal. Testing done at a later time would reveal no leakage of helium, and a defective feedthrough could not be differentiated from an acceptable feedthrough. The helium getter allows for the retention of helium for several days, and it is possible to detect and distinguish defective feedthroughs from acceptable feedthroughs by the gross and fine leakage testing methods.

The foregoing and additional advantages and characterizing features of the present invention will become clearly apparent upon your reading of the ensuing Detailed Description together with the included drawings.

BRIEF DESCRIPTION OF THE DRAWINGS

FIG. 1 is a sectional view of a cell utilizing the feedthrough of the present invention; and FIG. 2 is an enlarged sectional view of the feedthrough of the invention.

DETAILED DESCRIPTION OF THE PREFERRED EMBODIMENT

A lithium-iodine cell incorporating a feedthrough of the invention comprises a container or casing 10 of stainless steel which is preferably shaped as shown in FIG. 1, and which is relatively thin (not shown) as compared to its width, shown in the figure. Casing 10 has an open top which is closed and sealed by a lid 12 welded to the casing.

The cell includes anode electrode means 14 and cathode electrode means 16. As is already known in the art, anode means 14 may include lithium pressed on a current collector (not shown). The lithium may be partly held within a plastic frame or band 18 of a suitable material such as the plastic known as Halar, a registered trademark of Allied Chemical Corporation, more specifically identified as ethylenechlorotrifluoroethylene (ECTFE). Other plastics such as Kynar, a trademark of Pennwalt Corporation, 3 Parkway, Philadelphia, Pa. 19102 for polyvinylidene fluoride and Tefzel, a trademark of E.I. Du Pont de Nemours Co., Wilmington, Del. 19898, for a co-polymer of ethylene and tetrafluoroethylene may be used.

Frame 18 is provided with an aperture (not shown) through which lead pin 22 of electrical feedthrough 20 extends to contact the anode electrode means. The anode may also be provided with a thin coating 21 of poly-2-vinylpyridine. A cell of this type is shown in U.S. Pat. No. 4,128,703, the details of which are incorporated herein by reference.

Feedthrough 20 is shown in more detail in FIG. 2 and comprises a metal ferrule 24 through which lead pin 22 extends. The lead pin and ferrule may both be stainless steel. Pin 22 is held in position in ferrule 24 and insulated therefrom by means of a glass seal 26.

The element responsible for making the feedthrough capable of hermeticity and leakage testing as described hereinbefore constitutes the washer 27 which is placed in contact with the inner surface 26A of the glass seal 26. The exterior surface 26B of glass seal 26 is exposed to the outside of the lid 12 (FIG. 1). The helium getter means 27 comprises an element of fluorocarbon material, such as polyfluorotetraethylene (PFTE) made into the shape of a washer which is slipped over the lead 22 and into the interior ferrule of the ferrule 24 before the molding process described below is completed.

Ferrule 24 has formed about its lower external periphery at least one groove, preferably a plurality of spaced grooves 28 as shown. Grooves 28 are positioned on the ferrule so as to be inside of casing 10 when ferrule 24 is attached to lid 12, as by welding, and as shown in FIG. 1. A plastic, nonconductive body 30 which is inert to cell contents, preferably of the aforementioned ECTFE composition or other previously described plastic composition, is injection molded around a portion of ferrule 24 so as to contact grooves 28 and around a portion of pin 22. It preferably comprises an upper cylindrical portion 30A which encases the grooved portion of ferrule 24 as shown and a lower or cylindrical portion 30B which encases a portion of lead pin 22 and contacts anode 14 by extending into it. Metal band 31 compresses portion 30A against grooves 28.

In place of grooves 28, the ferrule may be threaded or its surface may be roughened, as by grit blasting, to facilitate connection between the ferrule and the plastic body. However, grooves 28 are preferred as they are discontinuous relative to each other and do not provide a potentially continuous path for leakage. All of these are collectively described herein as providing a textured contact surface on the ferrule for establishing gripping contact between it and the plastic body molded to it.

Feedthrough 20 is assembled by inserting lead pin 22 into a glass preform which may or may not already be mounted in the ferrule. The three-piece assembly is heated in an oven to fuse the glass and form an insulating seal between the lead pin and the ferrule and then cooled. The PTFE washer 27 is placed over the interior extending portion of lead pin 22 and into the cavity within the ferrule 24 and pressed against the inner surface 26A. Plastic body 30 is thereafter injection molded around the groove or grooves 28 on ferrule 24 and to lead pin 22 by conventional molding practices. The resultant feedthrough assembly 20 is welded to lid 12. The lower end of lead pin 22 is connected to a metal anode current collector (not shown). Lithium for anode 14 is pressed over the collector and lower portion 30B of plastic body 30 as can be seen in FIG. 1. The surface of portion 30B is also preferably textured to facilitate locking or gripping contact between it and the electrode means. For example, the plastic may be chemically etched as with Chem-Grip, a high flashpoint etching solution containing an active form of sodium marketed by Chemplast, Inc., 150 Dey Road, Wayne, N.J. 07470, or it may be mechanically roughened or otherwise roughened to a predetermined rough finish or a crinkle finish such as a 240 microinch surface finish or an EDM#36 finish.

The resultant feedthrough—anode assembly is positioned in an aperture of lid 12 and ferrule 24 is welded thereto. The entire assembly is then inserted into casing 10 and lid 12 is welded to the casing. Thereafter, the cathode material 16 is poured into the cell as described below. In the particular cell design described, casing 10 functions as the cathode collector/electrode.

Cathode 16 may comprise the reaction product of iodine and poly-2-vinylpyridine (P2VP) as is known in the art. It may be prepared by heating the polymer, adding desired amounts of iodine thereto, usually in excess of about 50 percent by weight, and heating the resultant mixture for a period of time. The material may be later reheated and poured into casing 10 through access aperture 32, provided in lid 12 for this purpose. Lid 12, feedthrough 20 and anode means 14 will have been previously assembled into casing 10. Aperture 32 will thereafter be welded closed with a closure member 34 therein.

The closure member 34 may also take the configuration disclosed and claimed in commonly assigned U.S. Pat. No. 4,174,424 for a seal arrangement for facilitating hermeticity leakage testing of an electrochemical cell.

The inclusion of the PTFE washer 27 within the electrical feedthrough depicted in FIG. 2, makes it possible to subject a hermetically sealed battery container to a pressurized helium test gas to detect defects or cracks in the glass seal 26 which could result in deterioration of its electrical insulating properties and the egress of iodine from the cell and into contact with the electrical circuit components powered by the cell (not shown). Leakage of iodine into the region of the feedthrough occupied by the washer 27 is itself a serious matter which is minimized by the injection molded insulator 30. However, if such leakage does occur, and if the seal 26 suffers from microscopic cracks or defects, then the probability of cell failure due to a short circuit and damage to other circuit components is high enough to warrant hermeticity leakage testing of the seal 26.

The hermeticity testing of the aforementioned cell is accomplished by constructing the electrical feedthrough with the teflon washer in position; attaching the feedthrough to the hermetically sealed cells; placing the completed electrochemical cell in a pressurized atmosphere of a test gas, such as helium, for a period of time to force the test gas through the glass seal into the chamber containing the fluorocarbon washer, whereby the fluorocarbon washer absorbs helium gas; and examining the electrochemical cell for leakage of any of the helium back out through the glass seal. Gross and fine leakage testing may be accomplished by respectively observing the escape of the test gas at atmospheric pressure and drawing a vacuum on the electrical feedthrough and testing for the escape of the test gas with a mass spectrometer.

In particular, the hermeticity leakage testing of the seal 26 is accomplished by subjecting the surface 26B to helium gas at 5 atmospheres (60 PSIG) in a bombing chamber for a period of time e.g., one hour, to fill the interior of container 10, including the washer 27, with helium gas. When the battery is subjected to inspection to detect the indicated gross leak, such as on the order of $1\times10^{-6}$ cc/sec. to $1\times10^{-4}$ cc/sec. or to a fine leak test, such as on the order of $4\times10^{-9}$ cc/sec. to $1\times10^{-6}$ cc/sec., the PTFE washer 27 will delay the escape of the test gas, thus allowing adequate time to place the battery within the mass spectrometer for leakage testing. The PTFE washer 27 has been found to be effective in allowing leakage testing to be performed at any time over a period from an hour to several days after the battery has been subjected to the helium gas.

The gross leak test may take place at atmospheric pressure in a bubble chamber where bubbles can be observed visually escaping from defective glass seals. The preferred mode of checking for leakage is a fine lead test wherein the power source is placed in a vacuum chamber and a mass spectrometer is employed to detect the quantity of helium gas in the chamber. If more than $4\times10^{-9}$ cc/sec. helium is present in the evacuated chamber (corresponding to a $1\times10^{-7}$ cc/sec. actual leak rate), the cell is classified as a fine leak check failure. Of course one need not perform a gross leak check if the fine leak check is performed.

Although any elastomer material may be utilized for inner plug member 18, the fluorocarbon polymers, sometimes referred to as fluoroelastomers, are particularly preferred. Such materials are polyvinylidene fluoride, hexfluoropropyfluoroethylene. Of the fluoroelastomers, as previously mentioned, PTFE is preferred. Other elastomers such as rubber, both natural or synthetic, silicone (such as the siloxane polymers), and other high-polymer materials having the property of extensibility and elastic recovery and possessing the requisite resistance to chemical reaction with the contents of the hermetic container to be tested may be used in this invention. All of the above materials are collectively termed herein "elastomers" or "elastomeric materials".

A particularly preferred PTFE material may be obtained from Chemplast, Inc., 150 Dey Road, Wayne, N.J. 07470, as pure virgin polytetrafluoroethylene rod stock which may be sized to form the polymeric plug 18.

The ferrule 24 and lid 12 are shown as separate elements which are welded together in assembly of the cell. It will be recognized that the ferrule and lid could be one piece formed in any desired shape to perform both functions.

Having described the invention by way of illustration, the exclusive property right therein is claimed as follows:

1. A method of manufacturing and testing an electrical feedthrough comprising these steps:
   forming an electrically insulating seal between a conductive lead and a metal ferrule through which the lead extends;
   positioning gas retaining material body means adjacent to the interior surface of said seal;
   molding a plastic body over a portion of the exterior surface of the ferrule, the body means and the pin;
   forcing gas through the exposed surface of said seal and into the gas retaining material body means; and
   observing the leakage of any gas from said gas retaining material body means through the exposed surface of said seal.

2. The method of claim 1 wherein helium gas is forced through glass seal means under a pressure of about 5 atmospheres.

3. The method of claim 2 wherein the step of observing the leakage of helium gas is conducted at ambient atmospheric pressure.

4. The method of claim 2 wherein the step of observing the leakage of helium gas through said glass seal further comprises the steps of:
   drawing a vacuum on the exposed surface of said glass seal means; and
   employing a mass spectrometer to detect the escape of minute quantities of helium gas through defects in said glass seal.

5. The method of claim 4 wherein the step of observing the gas leakage from the glass seal comprises:
   observing the indicated leakage of helium gas on the order of $4\times10^{-9}$ cc/sec. to detect a fine leak.

6. The method of claim 5 wherein the step of observing the lekage of helium gas comprises the steps of:
   observing the indicated rate of leakage of helium gas through the glass seal in the range of $1\times10^{-6}$ cc/sec. to $1\times10^{-4}$ cc/sec. to detect a gross leak.

7. The method of claim 1 wherein the step of observing the leakage of gas comprises the steps of:
   observing the indicated rate of leakage of gas through the seal in the range of $1\times10^{-6}$ cc/sec. to $1\times10^{-4}$ cc/sec. to detect a gross leak.

8. The method of claim 7 wherein the step of observing the gas leakage from the seal comprises:
   observing the indicated leakage of gas on the order of $4\times10^{-9}$ cc/sec. to detect a fine leak.

9. The method of claim 1 wherein the step of observing the leakage of gas through said glass seal means further comprises the steps of:
   drawing a vacuum on the exposed surface of said glass seal means; and
   employing a mass spectrometer to detect the escape of minute quantities of gas through defects in said glass seal means.

10. The method of claim 9 wherein the step of observing the leakage of helium gas comprises the steps of:
    observing the rate of leakage of helium gas through the glass seal means in the range of $1\times10^{-6}$ cc/sec. to $1\times10^{-4}$ cc/sec. to detect a gross leak.

11. The method of claim 9 wherein the step of observing the gas leakage from the glass seal means comprises:
    observing the indicated leakage of helium gas on the order of $4\times10^{-9}$ cc/sec. to detect a fine leak.

12. The method of claim 1 wherein the step of observing the leakage of gas is conducted at ambient atmospheric pressure.

* * * * *